June 17, 1930.  W. F. HAMILTON  1,764,402
DISK CULTIVATOR
Filed Sept. 17, 1928  3 Sheets-Sheet 2
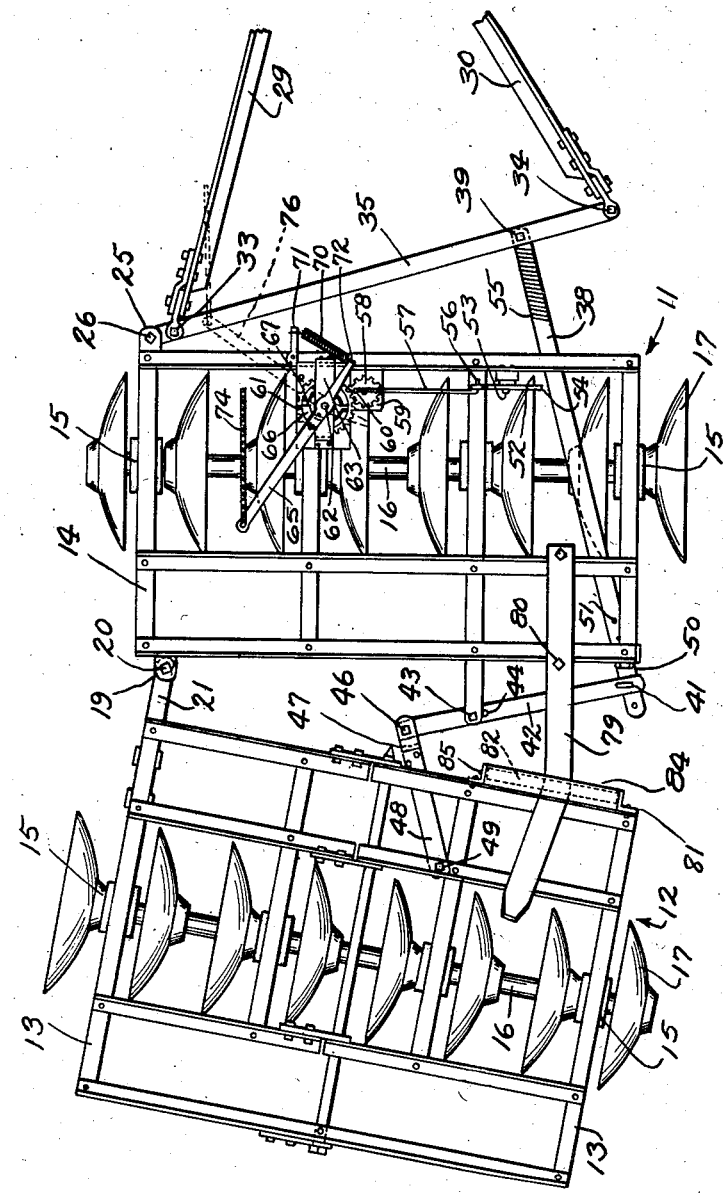
INVENTOR
William Francis Hamilton
BY
ATTORNEY June 17, 1930.  W. F. HAMILTON  1,764,402
DISK CULTIVATOR
Filed Sept. 17, 1928   3 Sheets-Sheet 3
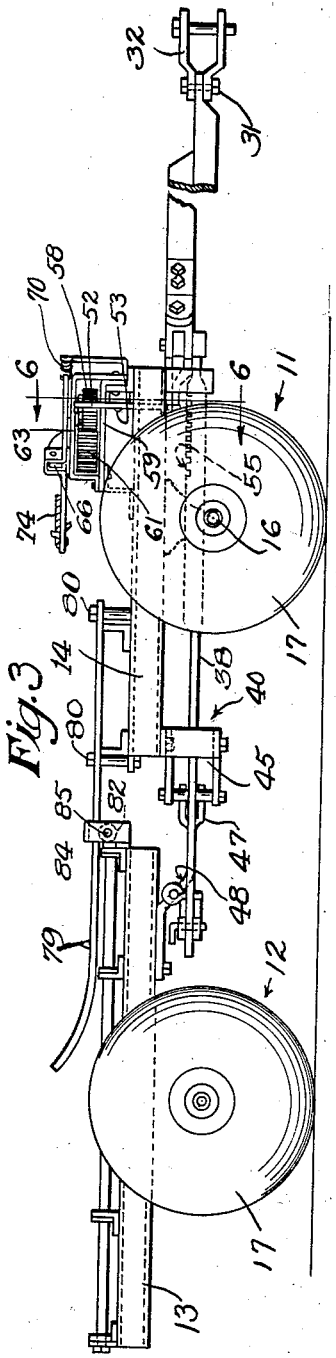
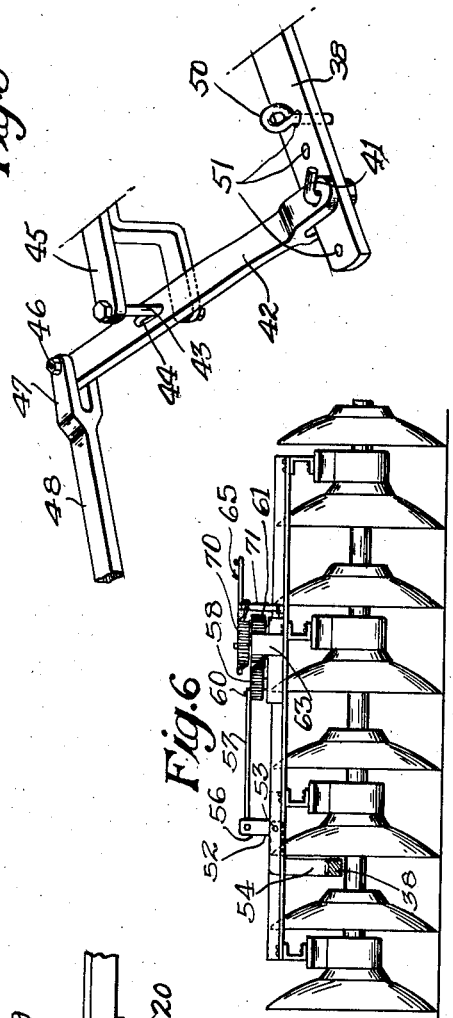
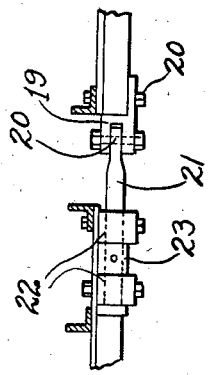
INVENTOR
William Francis Hamilton
BY
ATTORNEY Patented June 17, 1930

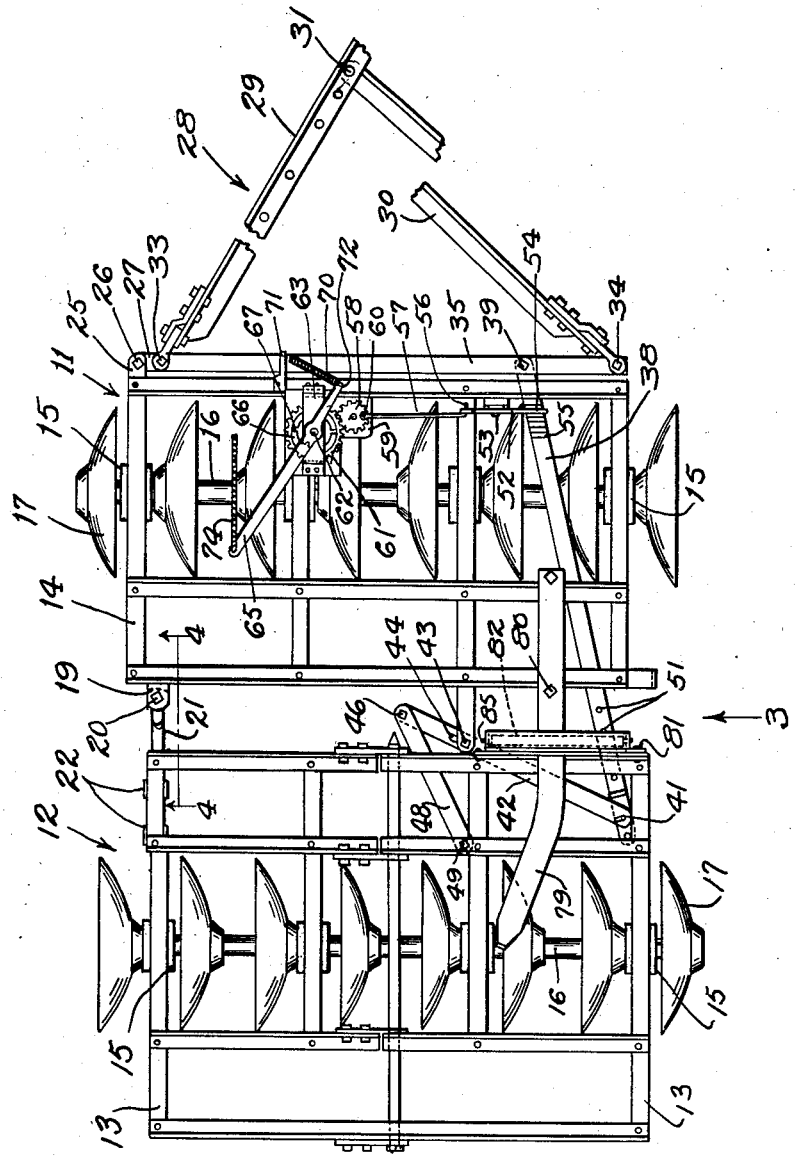

1,764,402

UNITED STATES PATENT OFFICE

WILLIAM FRANCIS HAMILTON, OF VENTURA, CALIFORNIA, ASSIGNOR TO VENTURA MANUFACTURING AND IMPLEMENT COMPANY, OF VENTURA, CALIFORNIA, A CORPORATION OF CALIFORNIA

DISK CULTIVATOR

Application filed September 17, 1928. Serial No. 306,370.

My invention relates to disk cultivators, and it is embodied in a novel design of disk cultivator including the objects which will now be pointed out.

One of the objects of the invention is to provide a disk cultivator in which the gangs may be readily moved from non-working position into working position.

A further object of the invention is to provide a disk cultivator in which the gangs may be moved from working position into non-working position by backing the tractive vehicle which moves the cultivator.

It is also an object of the invention to provide a disk cultivator in which the front-gang is pivoted to the draft-frame thereof at one side, and the rear-gang is pivoted to the front-gang at the same side.

A further object of the invention is to provide a disk cultivator in which a rear-gang operating-means is connected to the draft-frame and the rear-gang for swinging the rear-gang relative to the front-gang.

It is a still further object of the invention to provide a disk cultivator including means for preventing relative tilting of the front-gang and rear-gang.

Other objects and advantages of the invention will be pointed out in the following description.

My invention may be best understood by reference to the accompanying drawings in which, Fig. 1 is a plan view of my disk cultivator in non-working position.

Fig. 2 is a plan view in working position.

Fig. 3 is an elevational view of Fig. 1 taken as indicated by the arrow 3 of Fig. 1.

Fig. 4 is a section taken on the line 4—4 of Fig. 1.

Fig. 5 is a perspective view of a portion of the rear-gang operating-means of the invention.

Fig. 6 is a cross-section taken on the line 6—6 of Fig. 3.

Referring to the drawings in detail, my invention has a front-gang 11 and a rear-gang 12. These gangs 11 and 12 may be of any well known construction, each including rectangular frames 13 and 14 carrying bearings 15. Bearings 15 rotatably support a shaft 16, on which the cultivator-disks 17 are secured.

As shown best in Figs. 1, 2, and 4 the front-gang 11 is provided with a pivot-casting 19, which is attached by a bolt 20 to the rear left corner thereof. The pivot-casting 19 carries the vertical pivot or bolt 20 to which a pivot-link 21 is pivotally connected. The front left corner of the frame 14 of the rear-gang 12 is provided with a pair of spaced bearing-blocks 22, having aligned bores through which the cylindrical portion of the pivot-link 21 is extended. The pivot-link 21 is thus rotatably mounted in the bearing-blocks 22 and has a collar 23 secured to it between the bearing-blocks 22 in order to prevent relative longitudinal movement between the pivot-link 21 and the bearing-blocks 22.

The connection between the front-gang and the rear-gang permits a relative swinging action of the front-gang and the rear-gang on a horizontal plane, and also permits a relative transverse tilting motion of the front-gang and the rear-gang in a vertical plane. The vertical tilting is provided to prevent any strains being imposed on the pivotal connection.

The front left corner of the frame 14 of the front-gang 11 is provided with an ear 25 carrying a vertical pivot 26. The vertical pivot 26 carries a pivoted end 27 of the draft-frame 28 of the invention. The draft-frame 28 is comprised of a pair of draft-bars 29 and 30, which are connected together at 31, and which are associated with a draft-clevis 32, the draft-clevis 32 being adapted for attachment to a tractive vehicle. The rear-ends of the draft-bars 29 and 30 are connected at 33 and 34 to a cross-bar 35 of the draft-frame. The end 27, which is supported by the pivot 26, forms a part of the cross-bar 35.

Connected to the cross-bar 35 near the free end thereof is a link 38. This connection is formed by means of a pivot 39. The link 38 extends rearwardly through a frame 40 attached to the rear right corner of the frame 14 of the front-gang 11 so that the rear end of the link 38 may not drop to the ground, even though the rear end is detached from the parts to which it is ordinarily connected.

The rear end of the link 38 is connected by a removable pivot 41 to a lever 42. The lever 42 is attached to the front-gang 11 by means of a pivot 43, which extends through a slot 44 in said lever. The pivot 43 is carried by a bracket 45, this bracket 45 being secured to the rear part of the frame 14 on the front-gang 11. The end of the lever 42 opposite from the end to which the link 38 is connected hinges on a pivot 46 carried by a clevis 47 at the forward end of an arm 48. The opposite end of the arm 48 is pivoted at 49 to the frame 13 of the rear-gang 12. The rear end of the link 38 carries an adjustable stop 50, which may fit in one of the holes 51.

The parts which I have just described constitute the rear-gang operating means of the invention.

My invention also provides release-mechanism for permitting the disk cultivator to move from non-operating into operating position. This mechanism includes a latch 52 which swings in a vertical plane on a pivot 53 secured to the forward part of the frame of the front-gang 11. The latch-bar 54 of the latch 52 is adapted to engage in notches 55 formed in the upper part of the forward end of the link 38. The vertical lever 56 of the latch 52 is connected by a link 57 to an operating member in the form of a gear 58, this gear 58 being pivotally mounted on a plate 59 carried by the frame of the front-gang 11. The operating gear 58 carries an eccentric pivot 60 to which the link 57 is connected. Meshing with the gear 58 is a larger gear 61, which gear 61 is carired by a shaft 62.

The shaft 62 is supported by the plate 59 and a strap 63. The upper end of the shaft 62 has an operating arm 65 supported on it. The operating arm 65 carries a pawl 66 adapted to engage vertical shoulders 67 on the gear 61. The lever 65 is resiliently retained in the position shown in Figs. 1 and 2 by means of a spring 70 connected to the frame 14 of the front-gang 11 at 71, and to the extension 72 of the operating lever 65. The operating lever 65 has a flexible member 74 connected to it. The flexible member extends forward to the tractive vehicle, and serves as a means whereby the operating arm may be swung into the position indicated by the dotted lines 76 of Fig. 2. When the operating lever 65 is thus operating the large gear 61 is rotated, and the small gear 58 is rotated half a revolution so that the latch 52 may move from released position into engaged position.

In order to prevent relative longitudinal tilting between the front-gang and the rear-gang, I provide an arm 79 which is secured by bolts 80 to the rear upper corner of the frame 14 of the front-gang 11. The forward upper corner of the frame of the rear-gang 12 is provided with a bracket 81 which supports a roller 82. The roller 82 is adapted to rotate on a horizontal axis normally placed at right angles to the direction of movement of the disk cultivator when the disk cultivator is in non-working position. Extending above the roller 82 is a top-strap 84. The rearward end of the arm 79 extends above the roller 82 and below the top-strap 84. The arm exerts a pressure on the roller 82. The idea of providing the roller 82 is to reduce friction between the arm and the rear-gang so that the parts may operate as easily as possible.

In Fig. 1 the disk cultivator is shown in non-working position. At this time the latch 52 is engaged with adjacent teeth 55 and the parts are then locked to prevent relative movement. Thus it will be seen that the cultivator-disks 17 of both gangs rotate in planes parallel to the direction of travel of the disk cultivator; therefore there will be no cultivating or harrowing action. When it is desired to cultivate the ground over which the cultivator is passing, the operator who is riding the tractive vehicle pulls on the flexible member 74 so as to swing the operating lever 65 from the full line position as shown in Fig. 1 into position 76 as shown in Fig. 2. This causes the small gear 58 to rotate from the position shown in Fig. 1 into the position shown in Fig. 2. This raises the latch 52 and releases the link 38. When the link 38 is released, the pull of the draft-frame 28 on the front-gang 11 is at the upper left forward corner of the frame 14 as shown in Figs. 1 and 2. This tends to pull the forward end of the front-gang relative to the other parts. The result is that the front-gang 11 will move relative to the draft-frame 28 so as to occupy the relative position as shown in Fig. 2. When this action takes place the link 38 is pulled forwardly relative to the front-gang 11 until the adjustable stop 50 engages the rearward lower corner of the frame of the front-gang 11. This stop 50 determines the position of the front-gang 11 relative to the draft-frame 28.

The moving of the link 38 relative to the front-gang 11 causes the lever 42 to swing on its pivot 43. This causes the inner end of the lever 42, as shown in Figs. 1 and 2, to move rearwardly relative to the front-gang 11. In view of the connection of the lever 42 to the frame of the rear-gang 12 by means of the arm 48, the rear-gang 12 is swung relative to the front-gang 11, on the pivot 20, so that the parts, when in working position, occupy the relative positions as shown in Fig. 2. The cultivator-disks 17 are now disposed so that they do not rotate in planes parallel to the direction of travel of the disk cultivator; therefore the disks are in position to cultivate or harrow the soil.

During the moving of the parts from non-working into working position, the roller 82 is frictionally engaged by the arm 79 and is rotated on its axis 85. In view of this friction-reducing connection, the parts will move quite readily.

When the disk cultivator is to be returned to non-working position, the tractive vehicle is then backed, with the result that the draft-frame 28 is returned from the position shown in Fig. 2 into the position shown in Fig. 1, this action causing the gangs to return to the position shown in Fig. 1.

The mechanism may now be locked by again operating the lever 65 in the manner previously explained so as to rotate the small gear 58 another half revolution to return it to the normal position shown in Fig. 1. This permits the latch 52 to again engage the teeth 55 of the link 38 so as to lock the gangs in non-working positions.

I claim as my invention:

1. In a disk cultivator, the combination of: a front-gang; a rear-gang; a gang-pivot for pivoting together said front-gang and rear-gang; a draft-frame; a frame-pivot for pivoting together said front-gang and said draft-frame for relative swinging movement; and rear-gang operating-means connected to said rear-gang and said draft-frame for insuring a rearward swinging of said rear-gang relative to said front-gang upon a forward swinging of said draft-frame relative to said front-gang.

2. In a disk cultivator, the combination of: a front-gang; a rear-gang; a gang-pivot for pivoting together said front-gang and rear-gang; a draft-frame; a frame-pivot for pivoting together said front-gang and said draft-frame; and rear-gang operating-means connected to said rear-gang and said draft-frame, actuated by a relative swinging movement between said front-gang and said draft-frame in such a manner as to swing said rear-gang relative to said front-gang.

3. In a disk cultivator, the combination of: a front-gang; a rear-gang; a gang-pivot at one side of said front-gang and rear-gang for pivoting together said front-gang and rear-gang; a draft-frame; a frame-pivot at the same side of said front-gang as said gang-pivot for pivoting together said front-gang and said draft-frame for relative swinging movement; and rear-gang operating-means connected to said rear-gang and said draft-frame for insuring a rearward swinging of said rear-gang relative to said front-gang upon a forward swinging of said draft-frame relative to said front-gang.

4. In a disk cultivator, the combination of: a front-gang; a rear-gang; a gang-pivot at one side of said front-gang and rear-gang for pivoting together said front-gang and rear-gang; a draft-frame; a frame-pivot at the same side of said front-gang as said gang-pivot for pivoting together said front-gang and said draft-frame; and rear-gang operating-means connected to said rear-gang and said draft-frame, actuated by a relative swinging movement between said front-gang and said draft-frame in such a manner as to swing said rear-gang relative to said front-gang.

5. In a disk cultivator, the combination of: a front-gang; a rear-gang; a gang-pivot for pivoting together said front-gang and rear-gang; a draft-frame; a frame-pivot for pivoting together said front-gang and said draft-frame; and rear-gang operating-means connected to said rear-gang and said draft-frame for swinging said rear-gang relative to said front-gang, said rear-gang operating-means including a lever pivoted to said front-gang, a link connected to said lever and said draft-frame, and an arm connected to said lever and said rear-frame.

6. In a disk cultivator, the combination of: a front-gang; a rear-gang; a gang-pivot for pivoting together said front-gang and rear-gang; a draft-frame; a frame-pivot for pivoting together said front-gang and said draft-frame; and rear-gang operating-means connected to said rear-gang and said draft-frame, actuated by a relative swinging movement between said front-gang and said draft-frame in such a manner as to swing said rear-gang relative to said front-gang, said rear-gang operating-means including a lever pivoted to said front-gang, a link connected to said lever and said draft-frame, and an arm connected to said lever and said rear-frame.

7. In a disk cultivator, the combination of: a front-gang; a rear-gang; a gang-pivot at one side of said front-gang and rear-gang for pivoting together said front-gang and rear-gang; a draft-frame; a frame-pivot at the same side of said front-gang as said gang-pivot for pivoting together said front-gang and said draft-frame; and rear-gang operating-means connected to said rear-gang and said draft-frame for swinging said rear-gang relative to said front-gang, said rear-gang operating-means including a lever pivoted to said front-gang, a link connected to said lever and said draft-frame, and an arm connected to said lever and said rear-frame.

8. In a disk cultivator, the combination of: a front-gang; a rear-gang; a gang-pivot for pivoting together said front-gang and rear-gang; a draft-frame; a frame-pivot for pivoting together said front-gang and said draft-frame; rear-gang operating-means connected to said rear-gang and said draft-frame, actuated by a relative swinging movement between said front-gang and said draft-frame in such a manner as to swing said rear-gang relative to said front-gang; and release mechanism for permitting a relative pivotal movement between said front-gang and draft-frame.

9. In a disk-cultivator, the combination of: a front-gang; a rear-gang; a gang-pivot at one side of said front-gang and rear-gang for pivoting together said front-gang and rear-gang; a draft-frame; a frame-pivot at the same side of said front-gang as said gang-pivot for pivoting together said front-gang and said draft-frame; rear-gang operating-means connected to said rear-gang and said draft-frame, actuated by a relative swinging movement between said front-gang and said draft-frame in such a manner as to swing said rear-gang relative to said front-gang; and release mechanism for permitting a relative pivotal movement between said front-gang and draft-frame.

10. In a disk cultivator, the combination of: a front-gang; a rear-gang; a gang-pivot for pivoting together said front-gang and rear-gang; a draft-frame; a frame-pivot for pivoting together said front-gang and said draft-frame; rear-gang operating-means connected to said rear-gang and said draft-frame actuated by a relative swinging movement between said front-gang and said draft-frame in such a manner as to swing said rear-gang relative to said front-gang, said rear-gang operating-means including a lever pivoted to said front-gang, a link connected to said lever and said draft-frame, and an arm connected to said lever and said rear-frame; and release-mechanism for permitting a relative pivotal movement between said front-gang and draft-frame.

11. In a disk cultivator, the combination of: a front-gang; a rear-gang; a gang-pivot for pivoting together said front-gang and rear-gang; a draft-frame; a frame-pivot for pivoting together said front-gang and said draft-frame; rear-gang operating-means connected to said rear-gang and said draft-frame for swinging said rear-gang relative to said front-gang, said rear-gang operating-means including a lever pivoted to said front-gang, a link connected to said lever and said draft-frame, and an arm connected to said lever and said rear-frame; and release-mechanism including a latch for releasably engaging said rear-gang operating-means, said latch permitting a relative movement of said front-gang and draft-frame when said latch is released.

12. In a disk cultivator, the combination of: a front-gang; a rear-gang; a gang-pivot for pivoting together said front-gang and rear-gang; a draft-frame; a frame-pivot for pivoting together said front-gang and said draft-frame; rear-gang operating means connected to said rear-gang and said draft-frame for swinging said rear-gang relative to said front-gang, said rear-gang operating-means including a lever pivoted to said front-gang, a link connected to said lever and said draft-frame, and an arm connected to said lever and said rear-frame; and release mechanism including a latch for releasably engaging said link of said rear-gang operating-means, said latch permitting a relative movement of said front-gang and draft-frame when said latch is released.

In testimony whereof, I have hereunto set my hand at Ventura, California, this 11th day of September, 1928.

WILLIAM FRANCIS HAMILTON.